June 23, 1964   W. E. BOWERS ETAL   3,137,988
METHOD AND APPARATUS FOR STABILIZING CABLES
Filed Nov. 23, 1962   2 Sheets-Sheet 1
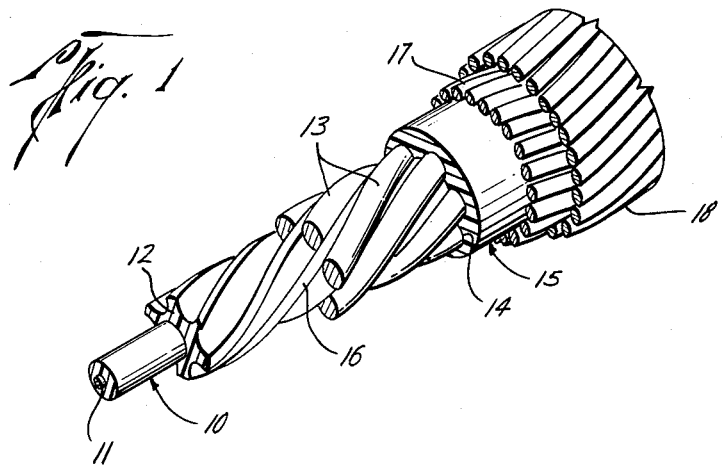
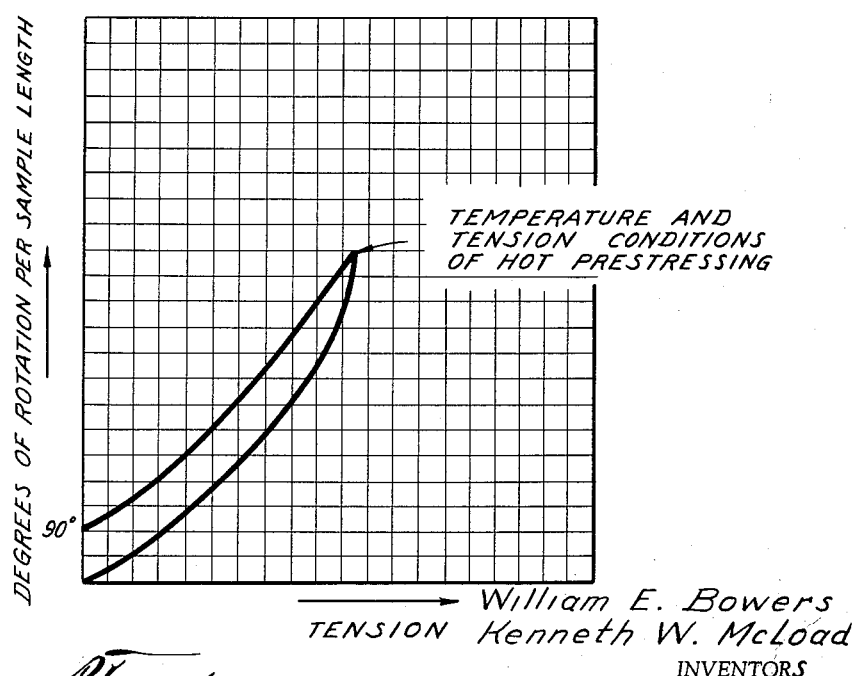
William E. Bowers
Kenneth W. McLoad
INVENTORS
BY Bertram N. Mann
ATTORNEY

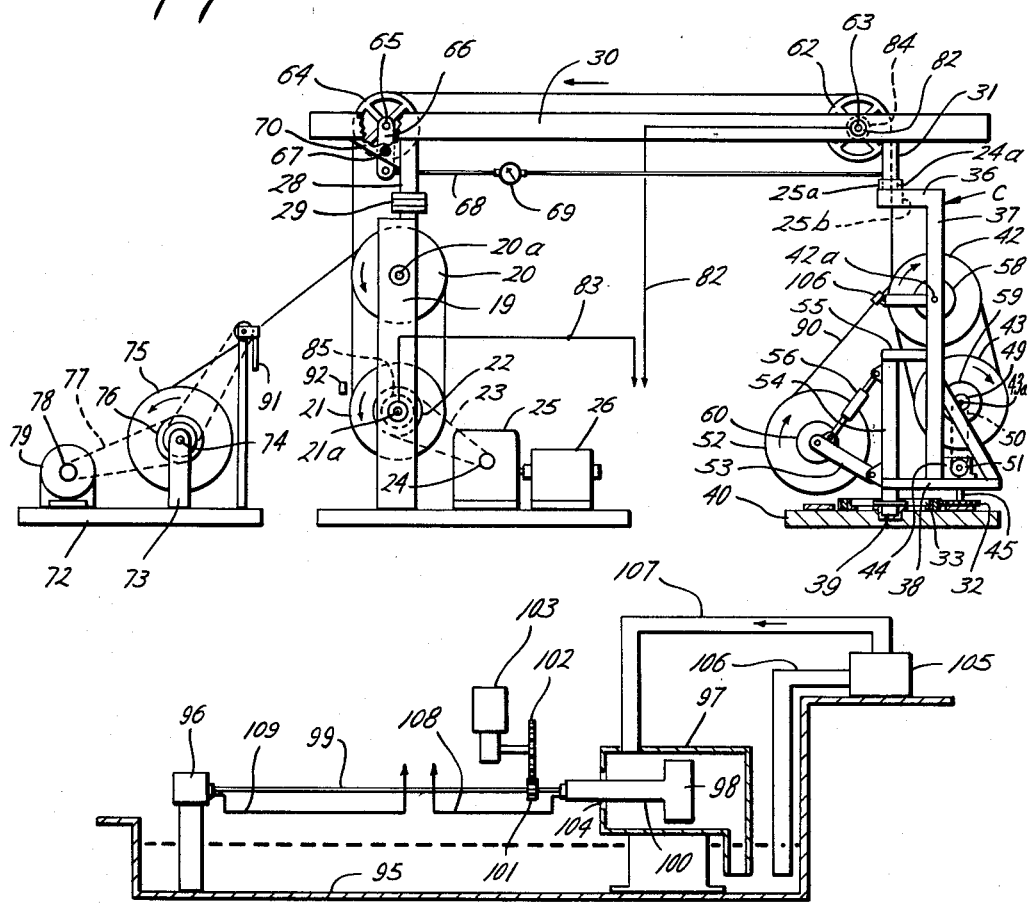

United States Patent Office 3,137,988
Patented June 23, 1964

3,137,988
METHOD AND APPARATUS FOR
STABILIZING CABLES
William E. Bowers and Kenneth W. McLoad, Houston,
Tex., assignors to Vector Cable Company, Houston,
Tex., a corporation of Texas
Filed Nov. 23, 1962, Ser. No. 239,591
14 Claims. (Cl. 57—55.5)

This invention relates to a method and apparatus for processing cables to achieve desired physical characteristics.

In many applications, it is important that the physical length of a cable be fixed or if the length changes, such changes be determinable. This is significant, for example, in well logging where an instrument is lowered into a well on an electric cable and the depth of the instrument is determined by measuring the amount of cable paid out. Usually, the length of cable in such an application changes with temperature and tension on cable but these length changes can easily be calculated from known temperature and tension data relationships. However, if the cable is irreversibly deformed in use (as by a permanent elongation), the cable length has changed and the precise depth of a logging instrument in the well at the time of use is not accurately determined. Moreover, if the cable length is determined by markers along the length of the cable, these markers are made inaccurate by permanent cable elongation. However, the problem of irreversible deformation of a cable can be solved by subjecting the entire length of cable before use to a "hot prestressing" operation. In this operation the cable is subjected to tension and heat in such a manner that the inherent irreversible deformation characteristics are substantially removed. After this operation, however, the cable has been found to have built-in torque stress or a torsional unbalance which produces cable rotation when the cable is in a well. Such cable rotation also alters the length characteristics of the cable causing inaccurate depth measurements and marker spacings. The rotation is, in fact, not predictable since it depends upon the depth and time at which the cable is left in a well so that the cable in routine service is not likely to stabilize the torque stress and its length.

Accordingly, an object of the present invention is to provide a novel method for stabilizing a cable against length changes due to torsional unbalance.

Another object is to provide novel apparatus for processing cable, including means for twisting or rotating a cable in an amount and direction necessary to compensate for a substantial part of torsional unbalance in a cable.

A still further object of the present invention is to provide new and improved systems of length stabilizing electrical cables.

Still another object of the present invention is to provide a novel method and apparatus for stabilizing a cable against length changes due to torsional unbalance by heating the cable and twisting the cable while heating in an amount and direction necessary to compensate for torsional unbalance in the cable.

The apparatus herein disclosed for achieving the above objects includes means for processing a cable between a takeup and supply reel. Such means includes a rotatable carriage on which a pair of pay-out capstans receiving the cable from a storage reel are supported. The cable, while being passed from the pay-out capstans to a powered draw-off capstan is hot prestressed and spooled on a storage spool. The carriage is pivotally mounted and rotated in controlled synchronism with the cable pay-out or speed so that the cable from one of the pay-out capstans is rotated or twisted about its axis. The direction of cable rotation or twisting is opposite to the direction of torque stresses in the cable to compensate substantially all of the torque stress in the cable. Thus, the cable wound on the draw-off spool is relieved of substantially all its torsional unbalance.

In the accompanying drawings which illustrate the invention,

FIG. 1 is a sectional view of a part of a cable adapted for linear stabilization by means of the herein-described method and apparatus.

FIG. 2 is a schematic representation of the apparatus.

FIG. 3 schematically represents a device for determining experimentally the twisting of a particular cable due to prestressing.

FIG. 4 is a chart of experimental data determinable from the apparatus of FIG. 3.

The cable shown in FIG. 1 is of a type used in suspending instruments, such as logging tools, in a well bore traversing earth formations. Extending axially of the cable is an insulated conductor 10 including conductor wires 11. Received about conductor 10 is a core matrix 12 and helically-wound outer conductors 13, which may be similar to conductor 10. Conductors 13 are embedded in outer core matrix portion 14 which fully and compactly embeds all of the conductors in an insulating sheath 15 with ribs 16 separating the conductors. Oppositely spiralled armor strands 17 and 18 are then laid on the surface of sheathing 15. Due to the different pitch diameters of the armor strands and the different sizes and materials frequently used, upon linear stretching of the cable, there will often be torsional stresses or unbalance about the cable axis built up in the cable. While a seven conductor cable is illustrated, it will be appreciated that the present invention is generally applicable to all cables having undesirable torque stresses. Similarly, other cables such as those using fillers between conductors rather than a solid matrix are susceptible to the practice of the present invention.

The apparatus is shown in elevational view in FIG. 2 since the apparatus is generally symmetrically arranged and its construction will be apparent from the discussion to follow. The frame includes at one end main vertical beams as 19, spaced apart transversely. Between the beams 19, upper and lower draw-off capstans 20 and 21 are rotatably mounted on shafts 20a and 21a respectively, the shafts being electrically insulated from the beams 19. Lower capstan 21 is provided with a sprocket gear 22 which is driven by means of a chain 23 from a sprocket gear 24 of a prestressing speed control gear box 25 which is driven by an electric motor 26.

Vertical support pieces 28 project above and are rigidly mounted on beams 19, as by means of bolting flanges, and are electrically insulated therefrom by insulation 29. Horizontal beams 30 are attached near their left-hand ends to pieces 28 and near their other ends to short vertical uprights 31. Suitable cross braces (not shown) are provided between beams 30 along their lengths. Uprights 31 are connected at their lower ends to a cross member 25b which has a central bearing boss 24a rotatably received in a cup bearing 25a centered on a cross support member 25b. Bearing parts 24a and 25a and cross support 25b are centrally apertured to receive the cable being processed therethrough.

Cross support 25b connects the inner ends of a pair of upper framing members 36 forming a C-frame carriage C with a pair of uprights 37 and a lower platform structure 38. Lower structure 38 has rotatable bearing means 39 aligned with upper bearing parts 24a and 25a and supported in a base plate 40. Hence, it will be appreciated that carriage C is pivotal about the axis of aligned bearings 24a and 39.

Carriage C is arranged to support pay-out capstans 42, 43, capstan 42 being pivotally mounted between beams 37 by a shaft 42a and capstan 43 being offset horizontally somewhat and pivotally supported by a shaft 43a. Platform structure 38 extends beyond vertical beams 37 to provide a floor upon which is mounted a conventional gear reduction means 44. Gearing means 44 has a vertical shaft 45 passed through platform 38 and a pinion 32 is attached to the lower end of the shaft. Pinion 32 meshes with an annular gear 33 fixed to the base plate 40 and arranged coaxially with journal bearing means 39. Capstans 42, 43, 20 and 21 have parallel, cable-receiving, circumferential grooving thereon. Capstan 43 has a sprocket gear 49 which is connected by a chain 50 to a sprocket gear 51, gear 51 being connected to the input of gearing means 44.

A pay-out supply spool or reel 52 is rotatably secured to one end of support beams 53 which are pivotally connected to the lower ends of a pair of short vertical beams 54. Beams 54 are attached at their lower ends to platform structure 38 and at their upper ends by cross pieces 55 to uprights 37. Hydraulically adjustable struts 56 support beams 53 and reel 52 and facilitate loading of the reel on the carriage. If desired, turn-buckles (not shown) can be provided between beams 53 and 54 to take the load from hydraulic means 56. Capstans 42 and 43 and spool 52 are also provided with frictional drag brake devices 58, 59 and 60.

It will be appreciated from the foregoing description that the carriage C and its supported capstans 42, 43, gear box 44 and also pay-out reel 52 rotate as a unit about the axis of bearing means 24a, 39 when pinion 32 is powered, the pinion traveling around stationary gear 33.

A cable sheave 62 is pivotally mounted by a shaft 63 between horizontal beams 30 and electrically insulated therefrom. Sheave 62 is located with respect to uprights 31 so as to receive cable being conditioned from capstan 42 through the aligned openings in cross member 25b and bearing means 24a and 25a.

Sheave 64, at the other ends of beams 30, is mounted by a spindle 65 on the upper ends of levers 66, in turn, pivotally mounted by a pin 67 on corner gussets 70 between beams 28 and 30. Sheave 64 is electrically insulated from levers 66 and the rest of the framing. The lower ends of levers 66 are pivotally connected to a bar 68 which incorporates a strain gauge 69. Bar 68 is connected at its other end to cross member 25b.

Adjacent the left-hand end of the framing is a platform 72 having transversely spaced pillow blocks 73 between which extends a shaft 74 which rotatably mounts the draw-off spool or reel 75. A sprocket 76 on one end of spool 75 is connected by a chain 77 to a sprocket 78 on an electric motor 79.

Electric current which is passed through the cable armor for the hot prestressing operation, is supplied by wiring 82, 83 from a suitable power source (not shown). Wiring 82 is electrically coupled by a commutator ring connection 84 to the shaft 63 of sheave 62 and thence to the cable. Wiring 83 is electrically connected by a commutator ring 85 to the shaft 21a of the draw-off capstan 21 to the cable. The electrical insulation provided confines the current to the section of cable extending between sheave 62 and capstan 21.

According to the present invention, a spool 52 containing a supply of cable to be processed is first mounted on the beams 53 of the rotating carriage C and the cable 90 is then threaded through a guide 106 and serially wound around capstans 42 and 43 within the circumferential grooves therein. After several turns around both the capstans, the cable is then passed through bearing means 24a, 25a and onto tensioning sheaves 62 and 64, thence serially around draw-off capstans 20 and 21, again passing several times around these capstans and in the circumferential grooves therein. Finally, the cable is passed through a level winding guide 91 to draw-off spool 75.

In operation, motor 26 provides power to capstan 21 to pull the cable 90 from supply spool 52 while motor 79 drives take-up reel 75. Proper tension on the cable is maintained by adjusting the brakes 58–60 on capstans 42, 43 and spool 52. The electric current provided via wires 82, 83 is passed through the length of cable between capstan 21 and sheave 62 and is adequate to heat the cable to a desired temperature. The tension applied should be constant and less than two-thirds of the rated breaking strength of the cable. Rated breaking strength is based upon the tensile strength of the minimum size of armor wires in the cable. The heating should be to a temperature between the temperature of plastic deformation of the cable core and the flow temperature thereof. A heat sensing device such as pyrometer 92 can be used to determine and control the temperature of the cable during the process. Strain gauge 69 is used to determine the tension applied to the cable in prestressing so that the prestressing conditions are closely controlled.

Capstans 42, 43 and 20, 21 perform their usual function of providing the tension on the cable between the take-up and supply spools 75 and 52. Capstan 43 when rotated by cable movement, imparts via chain 50 and gearing 51 rotation to pinion 32 which moves about stationary gear 33 and thus rotates carriage C. Rotation of the carriage rotates or twists cable 90 between capstan 42 and sheave 62 about the cable axis. As will hereinafter be more fully explained, this rotation of the cable about its axis is opposite in direction to the torque forces present and/or imparted to the cable in an amount determined sufficient to remove such torque forces. Hence, sprockets 49, 51, gearing means 44, and gears 32 and 33 are adjusted to provide the desired rotation of carriage C and the pay-out instrumentalities so as to apply a previously determined twist or rotation to the cable in the direction opposite to the torque forces in the cable. Thus, the compensating rotation will be applied to the cable continuously and concurrently with the stretching thereof during the pay-out operation. The amount of imparted rotation closely compensates for the torsional unbalance due to stretching and a torsionally-balanced cable will be collected on spool 75.

Turning now to FIGS. 3 and 4, FIG. 3 illustrates schematically a device for accurately measuring the torque forces in a definite length of cable while FIG. 4 illustrates measurements obtained from the device of FIG. 3. The apparatus may consist of a vat 95, providing a reservoir for hydraulic fluid. In the vat is a combination cable clamp and strain gauge device 96 and spaced therefrom, a cylinder 97 containing a rather loose-fitting piston 98. A selected length 99 of a cable which is to be processed is attached between the clamp device 96 and the stem portion 100 of piston 98. Another clamp 101 is attached to the cable near piston 98 and serves to impart cable rotation to a gear 102 and the amount of cable rotation is determined by a gauge 103. Piston stem 100 loosely fits in an orifice 104 in the end wall of cylinder 97. A hydraulic pump 105 draws fluid through inlet pipe 106, dipping into vat 95, and discharges the fluid through pipe 107 into cylinder 97 on the left side of piston 98. The free fit of both the piston 98 in its cylinder and stem 100 in orifice 104 permit the end of the cable attached to stem 100 to seek a stable rotational condition. Pump 105 has ample capacity, notwithstanding the leakage past the piston and through orifice 104, to apply pressure to piston 98 and thereby apply tensional forces to the cable test section, the tension being measured by device 96. Since the cable end attached to device 96 is fixed, the other end of the cable is free to rotate and the degree of rotation thereof is measured by device 103. Wires 109 and 108 are connected to the ends of the cable section to provide current to heat the cable to a temperature similar to the temperature of the hot prestressing operation.

After the cable is attached, pump 105 is operated to slowly apply pressure to the left side of piston 98 and thereby apply tension to the cable which tension is measured by gauge 96. As illustrated in FIG. 4, tension is applied to the cable to a value similar to that to be applied in the prestressing operation. Then the tension is released slowly returning the cable to its untensioned condition. When it has returned to zero tension, the rotation or torsional unbalance for the given length of cable can be determined from the gauge 103. This rotation per unit length is adjusted into the carriage rotation so that it is completely compensated for.

If desired, the cable rotation incident to stretching may be calculated according to cable formulas, rather than experimentally determined, as suggested by the use of the apparatus of FIG. 3. Moreover, the particular apparatus shown for accomplishing the novel cable stabilizing method may be modified in various ways, both substantially and in detail as will occur to those skilled in the art. For example, the carriage C need not depend upon the cable drive for rotation but independent driving means for the carriage may be provided, the driving means being synchronized with cable speed to impart the proper rotation to the cable. The invention may be modified in these and other respects as will occur to those skilled in the art, and the exclusive use of all modifications as come within the scope of the appended claims is contemplated.

We claim:

1. A method of stabilizing a torsionally unbalanced cable by twisting the cable along its length comprising the steps of
    passing a cable between two spaced locations before winding the cable on a spooling reel,
    determining prior to twisting the cable the amount and direction of torsional unbalance in a cable length equal to the spacing between said locations,
    and simultaneously imparting to the cable between said locations an angular twisting about its axis in an amount and in a direction opposite to the torsional unbalance in said cable sufficient to counteract such unbalance.

2. A method of stabilizing a torsionally unbalanced cable along its length comprising the steps of
    passing a cable between two spaced locations before winding the cable on a spooling reel,
    initially prestressing a length of cable and determining the amount and direction of torsional unbalance in a cable length equal to the spacing between said locations,
    and simultaneously imparting to the cable between said locations an angular twisting about its axis in an amount and in a direction opposite to the torsional unbalance in said cable sufficient to counteract such unbalance.

3. A method of stabilizing a torsionally unbalanced cable along its length comprising the steps of
    passing a cable between two spaced locations before winding the cable on a spooling reel,
    initially prestressing and heating a length of cable at controlled conditions and determining the amount and direction of torsional unbalance in a cable length equal to the spacing between said locations,
    and simultaneously imparting to the cable between said locations an angular twisting about its axis in an amount and in a direction opposite to the torsional unbalance in said cable sufficient to counteract such unbalance.

4. A method of stabilizing a torsionally unbalanced cable along its length comprising the steps of
    testing a section of cable to be stabilized by heating the cable section to a temperature between the plastic deformation of the cable core and the flow temperature thereof and simultaneously applying a constant tension of less than two thirds of the rated breaking strength of the cable;
    determining the degree of rotation produced between the ends of the cable section by the testing;
    passing the cable to be stabilized continuously between two spaced locations and applying a tension to said cables between said locations substantially the same as the testing tensions and simultaneously supplying heat to raise the cable between said locations to a temperature substantially the same as the testing temperature,
    and simultaneously imparting to the cable an angular twisting about its axis in an amount and direction opposite to the torsional unbalance in the cable sufficient to counteract the unbalance as determined from the testing of the cable section.

5. Apparatus for stabilizing a torsionally unbalanced cable comprising a support means having spaced bearings, carriage means mounted on said bearings for rotation, cable pay-out means carried on said carriage, cable draw-off means spaced from said carriage, means for driving said draw-off means and means for retarding said pay-out means for tensioning a cable passed therebetween, and additional driving means coordinated with said first-mentioned driving means for rotating said carriage and said pay-out means to cause twisting of a cable being paid out in a direction to compensate for torsional unbalance of the cable, said additional driving means comprising transmission means between said pay-out means and said carriage.

6. Apparatus for stabilizing a torsionally unbalanced cable comprising a support means having spaced bearings, carriage means mounted on said bearings for rotation, cable pay-out means carried on said carriage, cable draw-off means spaced from said carriage, means for driving said draw-off means and means for retarding said pay-out means for tensioning a cable passed therebetween, said pay-out means including a cable storage spool and at least one cable gripping capstan both mounted on said rotatable carriage means, said retarding means being applied to said capstan, additional driving means coordinated with said first-mentioned driving means for rotating said carriage and said pay-out means to cause twisting of a cable being payed out in a direction to compensate for torsional unbalance of the cable.

7. Apparatus for stabilizing a torsionally unbalanced cable comprising a support means having spaced bearings, carriage means mounted on said bearings for rotation, cable pay-out means carried on said carriage, cable draw-off means spaced from said carriage, means for driving said draw-off means and means for retarding said pay-out means for tensioning a cable passed therebetween, said pay-out means comprising a cable storage spool and a pair of capstans about which the cable is wound, said retarding means comprising braking devices applied to said capstans, and additional driving means interconnecting one of said capstans and said rotating structure, said additional driving means being coordinated with said first driving means for rotating said carriage and said pay-out means to cause twisting of a cable being payed out in a direction to compensate for torsional unbalance of the cable.

8. Apparatus for stabilizing a torsionally unbalanced cable comprising means for tensioning a cable over a fixed distance and including at least two capstans, cable pay-out and take-up means for supplying and receiving cable from said capstans, and means to rotate said cable pay-out means and its associated capstan about the axis of a cable being payed out in synchronism with the speed of the cable in a direction opposite to torsional unbalance in the cable and sufficient to counteract such torsional unbalance.

9. A method of processing an armored electrical cable along its length comprising the steps of: passing an entire length of cable between two spaced locations before winding the cable on a spooling reel, tensioning and heating said cable as it is passed between said two locations sufficiently to permanently elongate said cable, and simultaneously imparting to said cable an angular twisting in an amount and in a direction opposite and substantially equal to torsional unbalance of said cable between said locations.

10. A method of processing an armored electrical cable along its length comprising the steps of: drawing an entire length of cable between two spaced locations before winding the cable on a spooling reel, tensioning and heating said cable as it is passed between said two locations sufficiently to permanently elongate said cable, and rotating said cable about its axis in an amount and in a direction opposite to torsional unbalance in the cable sufficient to counteract such torsional unbalance.

11. Apparatus for stabilizing an armored electrical cable comprising: means for supplying an armored electrical cable, means for spooling such a cable on a reel, means between said supplying means and spooling means for tensioning sections of such a cable passing therebetween, means for heating sections of such a cable passing between said tensioning means, said tensioning means and heating means cooperating to permanently elongate such a cable, and means for rotating one of said supplying means and spooling means to rotate sections of such a cable about its axis, said rotating means being synchronized relative to the speed of such a cable between said tensioning means for rotating cable sections in a direction opposite to cable torsional unbalance in an amount sufficient to counteract such torsional unbalance.

12. Apparatus for stabilizing an armored electrical cable comprising: means for supplying an armored electrical cable, means for spooling such a cable on a reel, means between said supplying means and spooling means for tensioning sections of such a cable passing therebetween, means for heating sections of such a cable passing between said tensioning means, said tensioning and heating means cooperating to permanently elongate such a cable, and means for rotating said supplying means to rotate sections of such a cable about its axis, and means synchronizing said rotating means relative to the speed of such a cable between said tensioning means for rotating cable sections in a direction opposite to cable torsional unbalance in an amount sufficient to counteract such torsional unbalance.

13. The apparatus of claim 8 and further including means for heating a cable between said tensioning means.

14. A method of stabilizing a torsionally unbalanced hot prestressed, electrical armored cable along its length wherein the cable has been stressed while heated to provide a length stable cable and said cable so treated has a torsional unbalance of which the amount and direction in a unit of length of the cable is determinable, comprising the steps of:

passing such a cable comprised of a number of unit lengths from end to end between spaced locations before winding the cable on a spooling reel, and continuously imparting to the cable between said locations, an angular twisting about its axis in an amount and in a direction opposite and substantially equal to the torsional unbalance of a unit length of the cable to remove such unbalance uniformly along the entire length of cable from end to end.

References Cited in the file of this patent

UNITED STATES PATENTS

| | | |
|---|---|---|
| 2,280,500 | Reyburn | Apr. 21, 1942 |
| 2,714,282 | Rozieres | Aug. 2, 1955 |
| 2,940,883 | Peirce | June 14, 1960 |

FOREIGN PATENTS

| | | |
|---|---|---|
| 724,101 | Great Britain | Feb. 16, 1955 |